United States Patent

Okunishi

[11] Patent Number: 5,670,855
[45] Date of Patent: Sep. 23, 1997

[54] MOTOR CONTROL DEVICE

[75] Inventor: Kazuo Okunishi, Aichi-ken, Japan

[73] Assignee: Minolta Co., Ltd., Osaka, Japan

[21] Appl. No.: 447,987

[22] Filed: May 23, 1995

[30] Foreign Application Priority Data

Jun. 1, 1994 [JP] Japan .................................. 6-120281
Nov. 24, 1994 [JP] Japan .................................. 6-289489

[51] Int. Cl.$^6$ .............................. G03B 27/34; H02P 8/00
[52] U.S. Cl. ........................... 318/696; 318/138; 318/685; 355/56
[58] Field of Search ...................... 318/560–696; 355/55, 56, 243

[56] References Cited

U.S. PATENT DOCUMENTS 4,833,544  5/1989  Sato et al. .......................... 358/287
5,113,218  5/1992  Morikawa et al. .................. 355/56

Primary Examiner—Paul Ip
Attorney, Agent, or Firm—Sidley & Austin

[57] ABSTRACT

A motor control device for controlling a plurality of stepping motors, e.g., to move optical scanning units in an electrophotographic copying apparatus has a pulse generator, a pulse counter for counting the number of pulses generated by the pulse generator, a driver for driving the plurality of stepping motors in accordance with pulses generated by the pulse generator, a selector for selecting connections between the driver and each stepping motor, a comparison device for comparing the excitation phase of the driver and the excitation phase of each respective stepping motor, and a controller for matching the excitation phase of the driver and the excitation phase of each stepping motor based on the results of the comparison by the comparison device. This enables control of a plurality of stepping motors by a single driver without causing excessive load on a CPU, and reliably matches the excitation phase output fed by the driver relative to the excitation phase of the stepping motor which was stationary on the previous cycle.

11 Claims, 18 Drawing Sheets

FIG. 13

| | COUNTER C | COUNTER S | COUNTER L | COUNTER M |
|---|---|---|---|---|
| Power Source ON<br>INITIALIZATION OF COUNTER C | UNKNOWN | UNKNOWN | UNKNOWN | UNKNOWN |
| | 0 | ↑ | ↑ | ↑ |
| 4 pulses in the CCW direction for SCANNERS | 4 | ↑ | ↑ | ↑ |
| COUNTER S ← COUNTER C | 4 | 4 | ↑ | ↑ |
| 3 pulses in the CCW direction for LENS | 1 | 4 | ↑ | ↑ |
| 1 pulse in the CW direction for LENS | 2 | 4 | ↑ | ↑ |
| COUNTER L ← COUNTER C | 2 | 4 | 2 | ↑ |
| 7 pulses in the CCW direction for MIRRORS | 3 | 4 | 2 | ↑ |
| COUNTER M ← COUNTER C | 3 | 4 | 2 | 3 |
| TEST SCANNING<br>SELECTOR ← OFF<br>1 pulse in the CW direction | | | | |
| SELECTOR ← MOTOR M1 | 4 | 4 | 2 | 3 |
| 2500 pulses in the CW direction | 0 | 0 | 2 | 3 |
| 2500 pulses in the CCW direction | 4 | 4 | 2 | 3 |

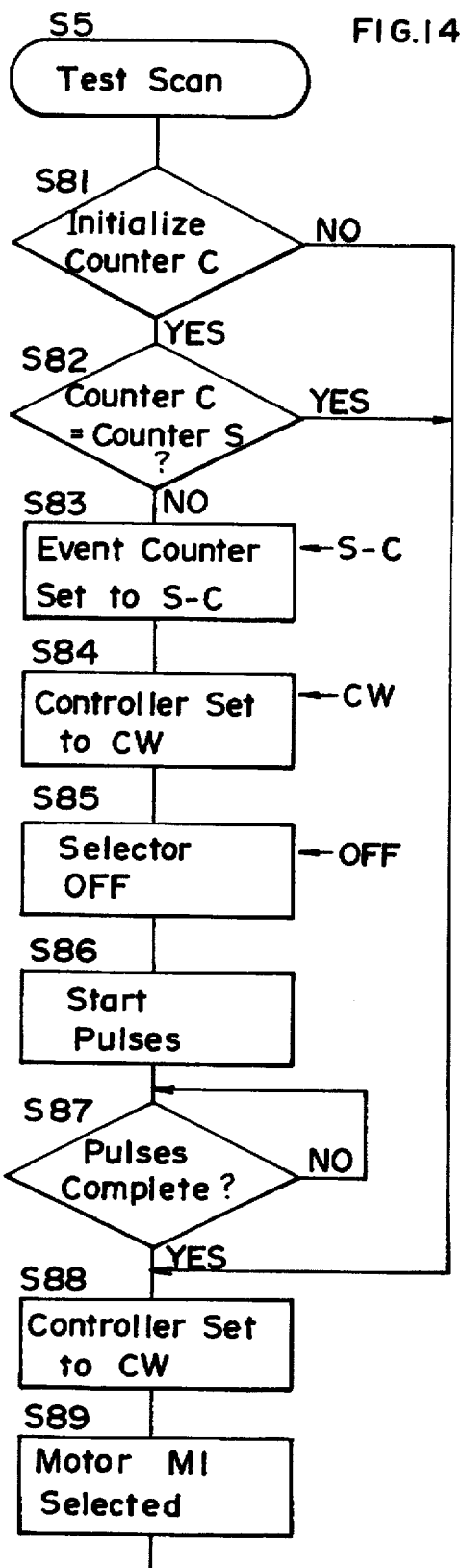
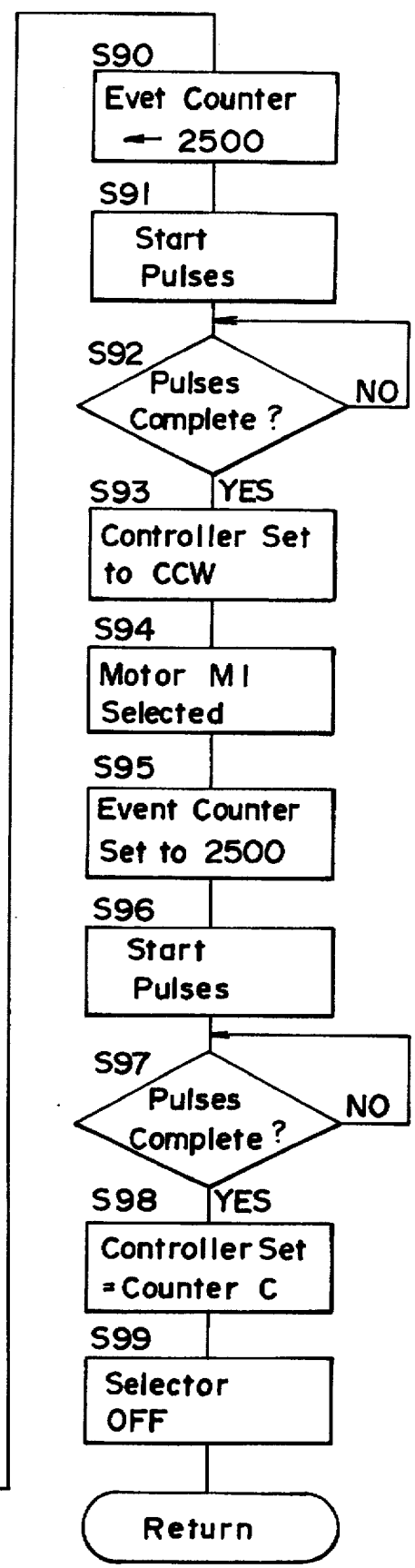
FIG.14

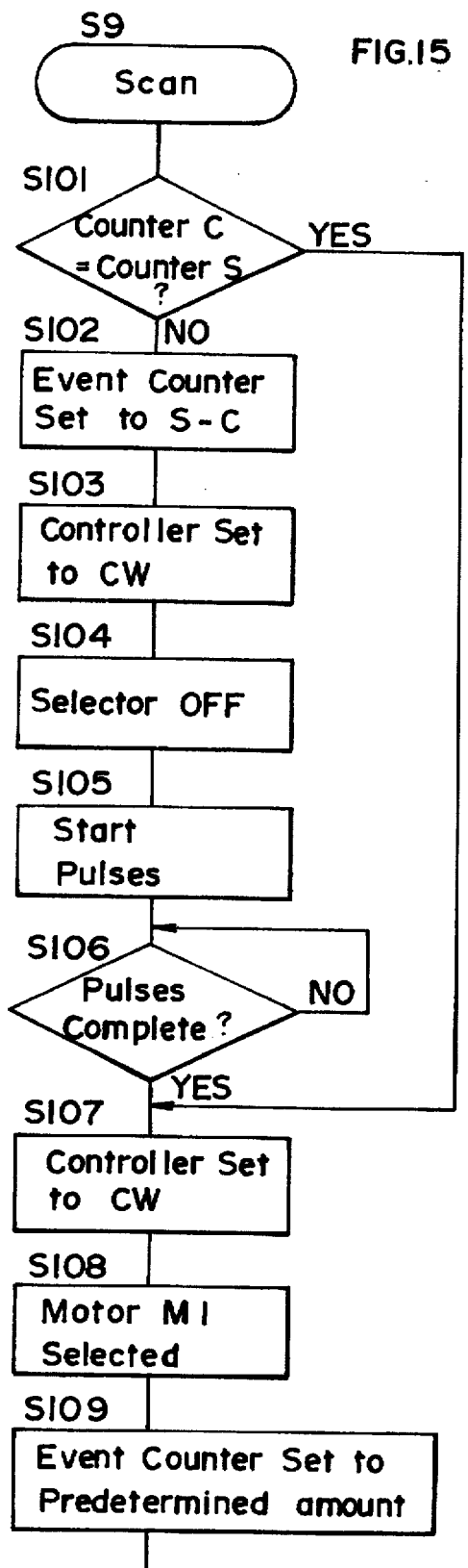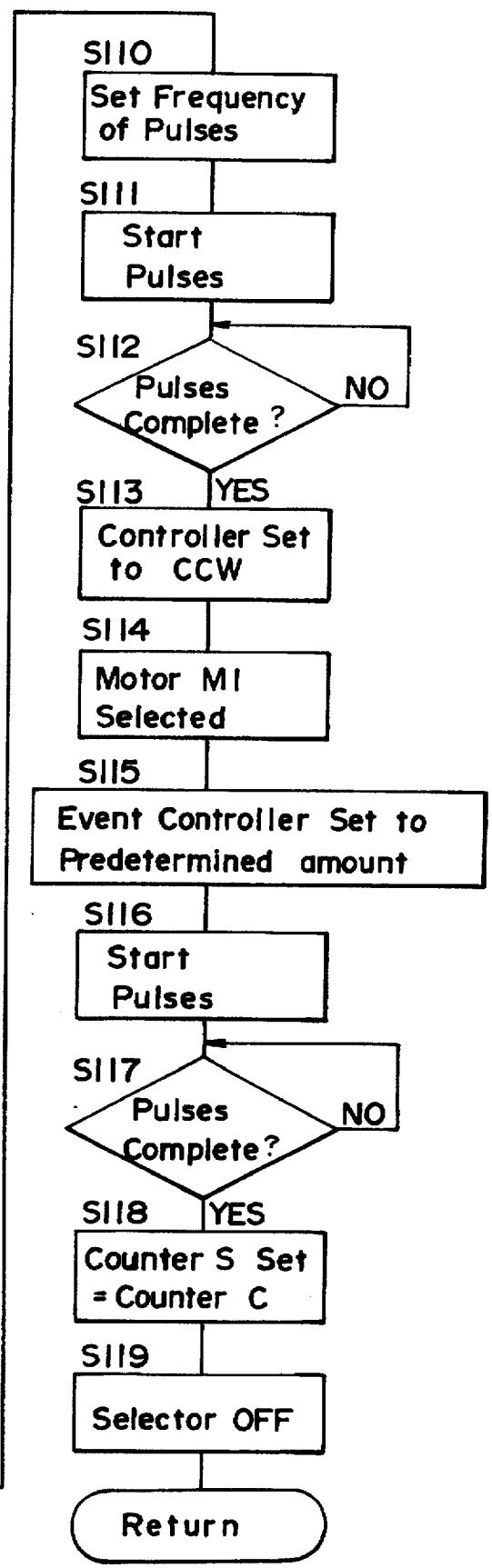
FIG.15

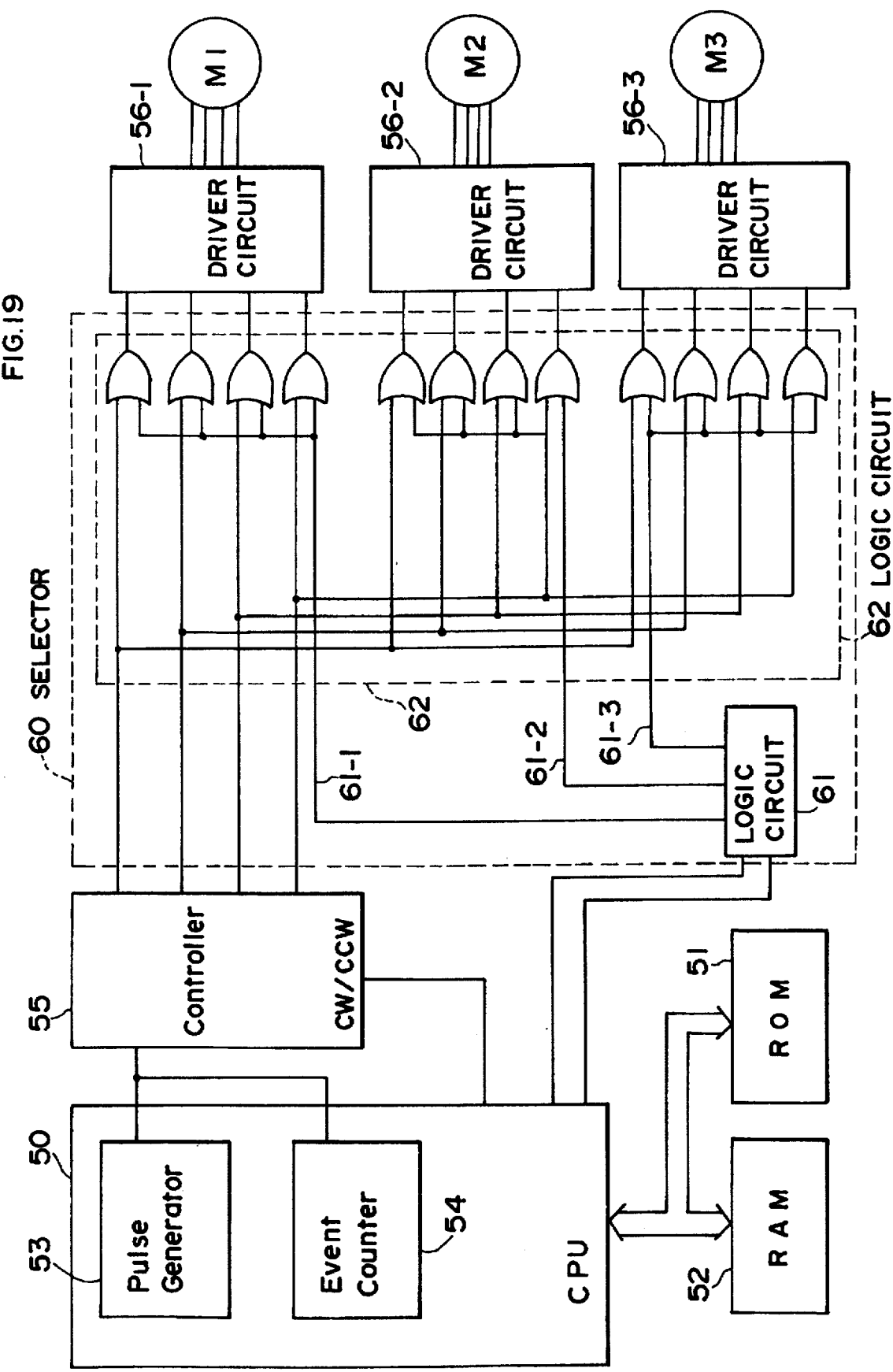

MOTOR CONTROL DEVICE

BACKGROUND OF THE INVENTION

1. Field of the Invention

The present invention relates generally to a motor control device; and, more particularly, to a motor control device for controlling a plurality of stepping motors in an electrophotographic copying apparatus.

2. Description of the Prior Art

Stepping motors generally provide an amount of rotation proportional to the number of pulses received, i.e., provide a speed proportional to a frequency-dividing ratio. Therefore, stepping motors provide an advantage insofar as position control and speed control of a body can be an open loop control. In view of this advantage, stepping motors are commonly used to move mirrors to correct for lens movement and for conjugate length corrections in variable magnification in the field of electrophotographic copying apparatus.

When a plurality of stepping motors are controlled by a microcomputer (hereinafter referred to as a "CPU"), control methods generally connect the stepping motors to CPU output ports via respective drive circuits. Such control methods typically generate clock (pulse) signals using an internal timer in the CPU to start an interrupt process timed to each generation of the pulse, so as to change the excitation phase. Position control and speed control processes are then executed during the interrupt process. However, such control methods increase the load on CPU processing. In addition, interrupt processing is started with particular frequency in the case of controlling scanning motors of optical units requiring high speed rotation, thereby delaying other controls of the copying apparatus such that there may be concern that overall control cannot be achieved. Even if the above disadvantages can be eliminated by providing a CPU with high performance processing capability, such a CPU and its peripheral devices would be expensive and impractical.

On the other hand, consideration has been given to control methods which provide a control circuit externally of the CPU, such that each stepping motor is connected to the control circuit via driver circuits (refer to U.S. Pat. No. 5,113,218). In this control method, a plurality of stepping motors are switchably controlled by a single control circuit, so as to be cost-effective, to minimize the frequency of interrupt processing, and to reduce the load on the CPU. However, in order to switchably control a plurality of stepping motors, there is concern about unnecessary motor rotation when the control circuit excitation phase during switching does not match the excitation phase of the switched motor which was stationary in the previous cycle. This type of rotation poses a significant disadvantage to motor control methods requiring precise processing of position controls.

SUMMARY OF THE INVENTION

According to the present invention, a motor control device is provided with a control circuit to minimize the load on a CPU, while permitting precise position control by eliminating mismatched excitation phases during motor switching.

A motor control device of the present invention provides control of a plurality of stepping motors and comprises pulse generating means, pulse counting means for counting the number of pulses generated by the pulse generating means, drive means for driving the plurality of stepping motors in accordance with pulses generated by the pulse generating means, selection means for selecting connections between the drive means and each stepping motor, comparison means for comparing the excitation phase of the drive means and the excitation phase of each stepping motor, and control means for matching the excitation phase of the drive means and the excitation phase of each stepping motor based on the results of the comparison by the comparison means.

The motor control device of the present invention is particularly designed to control an optical scanning system of a copying apparatus and provides control of a plurality of stepping motors by a single drive means without causing excessive load on the CPU, and reliably matches the excitation phase output fed by the drive means relative to the excitation phase of the switched object, i.e. a stepping motor, which was stationary on the previous cycle.

Yet further advantages and specific details of the invention will be set forth hereinafter in conjunction with the following detailed description of presently preferred embodiments.

BRIEF DESCRIPTION OF THE DRAWINGS

FIG. 13 is an illustration showing the operation of various counters in the examples of return shown in FIG. 12;

FIG. 14 is a flow chart of a subroutine of the main routine of FIG. 6 showing the control sequence of a test scan;

FIG. 15 is a flow chart of a subroutine of the main routine of FIG. 6 showing the control sequence for scanning during a copy operation;

FIG. 19 is a block diagram showing a control circuit for the optical scanning unit of FIGS. 2A and 2B according to an alternative embodiment of the invention.

DETAILED DESCRIPTION OF PREFERRED EMBODIMENTS

Preferred embodiments of a motor control device according to the present invention are described hereinafter with reference to the accompanying drawings. The described embodiments apply the invention to the control of an optical scanning system of a copying apparatus.

Figure 1:
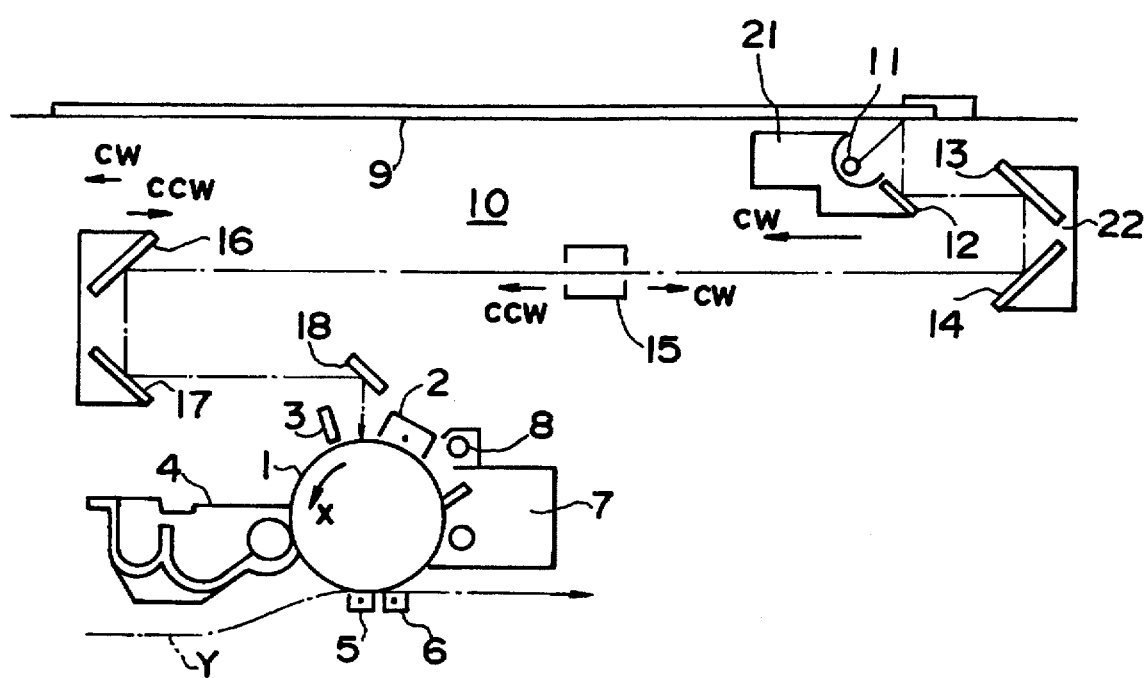
FIG. 1 schematically illustrates a copying apparatus which may incorporate a motor control device according to the present invention.

FIG. 1 schematically illustrates a copying apparatus of the electrophotographic type which optically scans an image on the surface of a photosensitive drum by means of the movement of an optical unit.

As shown in FIG. 1, photosensitive drum 1 is rotatably driven in the direction of arrow x. Arranged around the periphery of photosensitive drum 1 are charger 2, image interval eraser lamp 3, developing device 4 of the magnetic brush type, transfer charger 5, sheet separation charger 6, residual toner cleaning device 7, and residual charge eraser lamp 8. A copy sheet (not shown) is transported from the left in FIG. 1 along a path indicated by dashed line Y, and after image transfer from the photosensitive drum to the sheet, the sheet passes through a fixing device (also not shown), and is then discharged outside the apparatus.

The various image forming elements referred to above may be of common types, such that a detailed description of their construction and operation is omitted herein for the sake of brevity.

As also shown in FIG. 1, an optical unit 10 is provided below a document platen 9, and comprises an exposure lamp 11, first mirror 12, second mirror 13, third mirror 14, image forming lens 15, fourth mirror 16, fifth mirror 17, and sixth mirror 18. A document to be copied (not shown) placed on document platen 9 is exposed to light from exposure lamp 11, and the light reflected from the document is reflected by mirrors 12, 13 and 14, passed through lens 15, and reflected by mirrors 16, 17, and 18 to form an image of the document on the surface of photosensitive drum 1.

Exposure lamp 11 and first mirror 12 are integrally formed as a first scanner 21, and second mirror 13 and third mirror 14 are integrally formed as a second scanner 22. Scanning of a document image is accomplished by the movement of scanners 21 and 22 in the direction of arrow cw (shown adjacent thereto). During scanning, first scanner 21 moves at a speed of v/m (where v is the peripheral speed of photosensitive drum 1, and m is the copy magnification), and second scanner 22 moves at a speed of v/2m. The speed ratio of scanners 21 and 22 is set at 2:1 in order to maintain a constant distance from the document surface to lens 15 during scanning.

FIG. 1 shows the arrangement of image forming lens 15, fourth mirror 16, and fifth mirror 17 at equal magnification. For variable magnification, the lens 15 and the mirrors 16 and 17 must move in the directions of the arrows cw and ccw, respectively (as shown adjacent thereto).

Figure 2A:
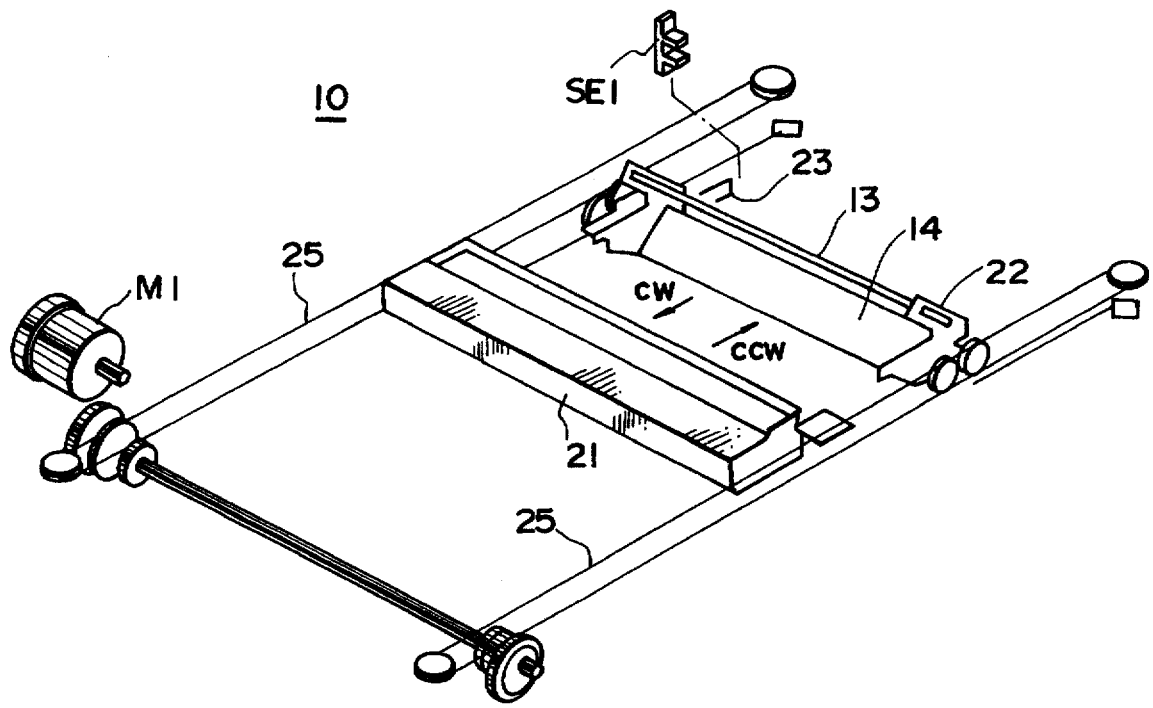
FIGS. 2A and 2B are perspective views showing the drive mechanism of an optical scanning unit provided in the copying apparatus of FIG. 1.
Figure 2B:
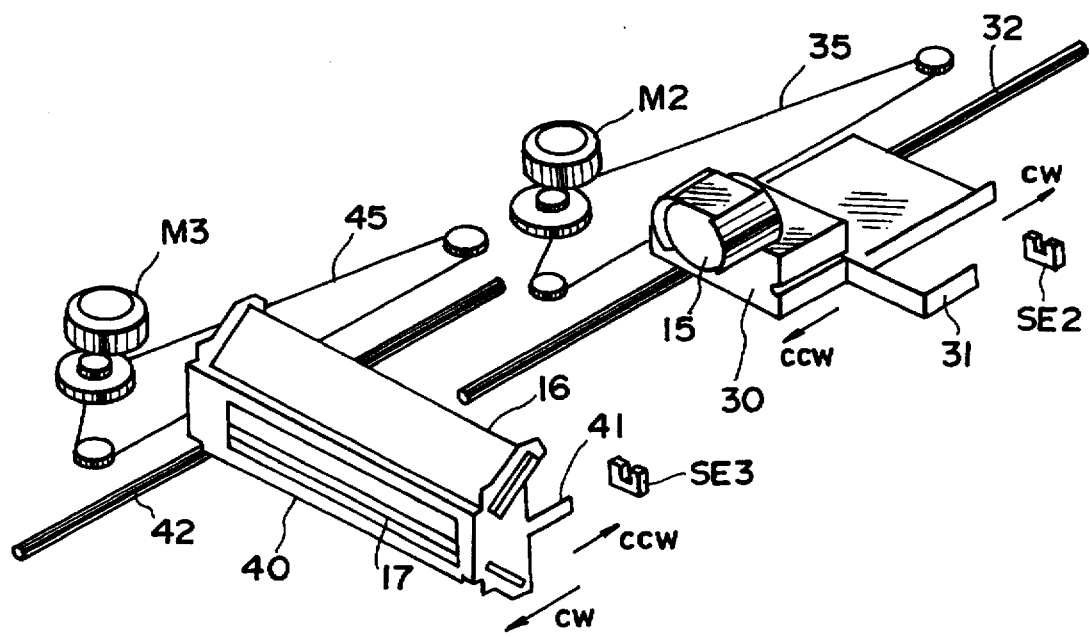

FIGS. 2A and 2B show the drive mechanism of optical unit 10 of FIG. 1. As shown in FIG. 2A, first scanner 21 and second scanner 22 are moved in the cw and ccw directions via a pair of wires 25 and 25 looped around both scanners and driven by scanner stepping motor M1. Photosensor SE1 for detecting the original position of the scanners is turned ON and OFF by a protrusion 23 provided on second scanner 22. In particular, the original positions of scanners 21 and 22 are detected when protrusion 23 is inserted in the optical path of photosensor SE1 and switches ON the photosensor.

As shown in FIG. 2B, image forming lens 15 is movable along a guide rail 32 through lens frame 30, and moves in the cw and ccw directions via a wire 35 driven by lens stepping motor M2. Original position detecting photosensor SE2 is turned ON and OFF by a protrusion 31 provided on frame 30, such that the original position of lens 15 is detected when protrusion 31 is inserted in the optical path of photosensor SE2 and switches ON the photosensor.

Fourth mirror 16 and fifth mirror 17 are movable along guide rail 42 through mirror frame 40, and move in the cw and ccw directions via a wire 45 driven by mirror stepping motor M3. Original position detecting photosensor SE3 is turned ON and OFF by a protrusion 41 provided on frame 40, such that the original positions of mirrors 16 and 17 are detected when protrusion 41 is inserted in the optical path of photosensor SE3 and switches ON the photosensor.

Figure 3:
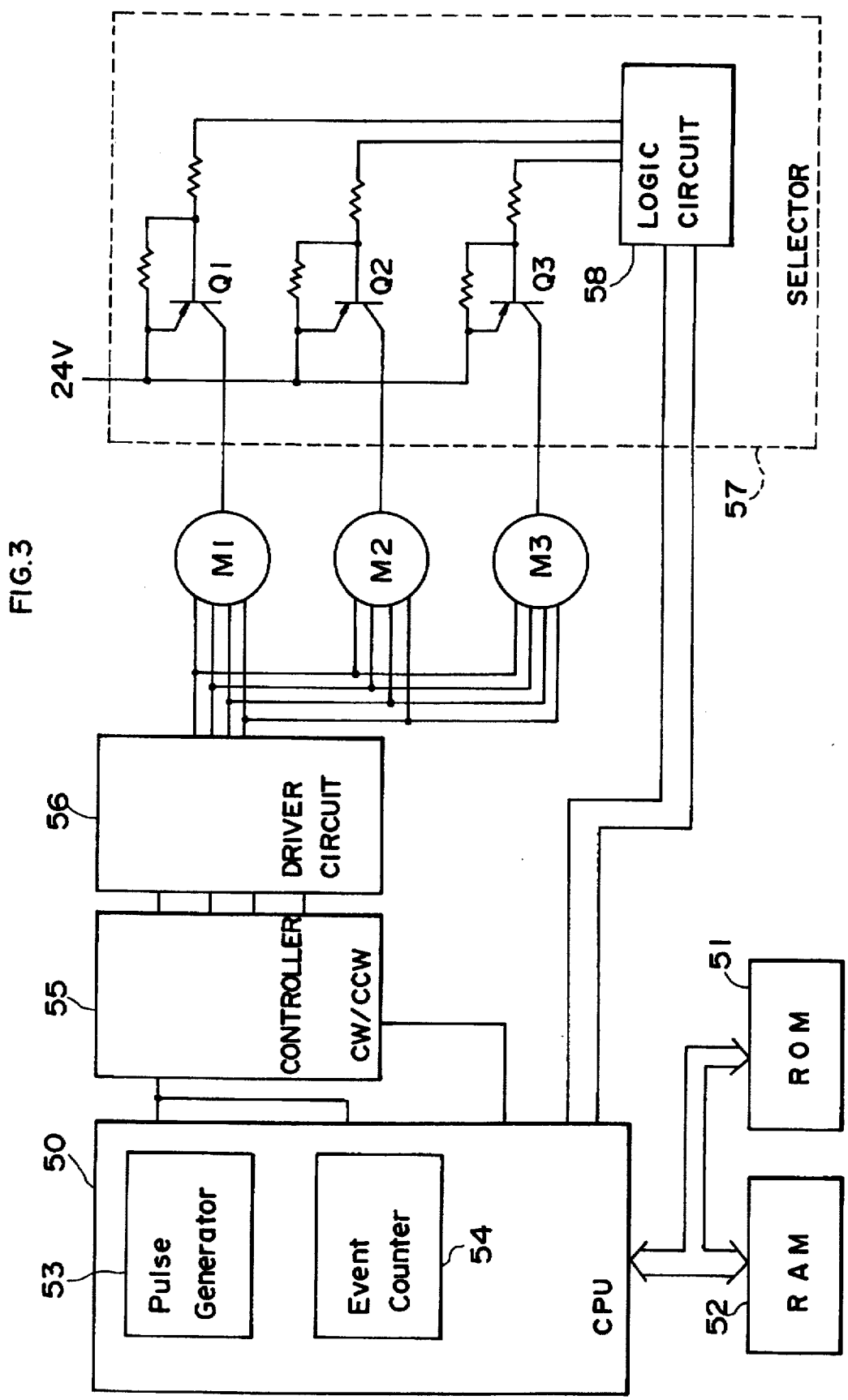
FIG. 3 is a block diagram showing a control circuit for the optical scanning unit of FIGS. 2A and 2B according to one presently preferred embodiment of the invention.

FIG. 3 shows the control circuit for the stepping motors M1, M2, and M3 which comprise stepping motors of the unipolar type.

Control of the various operations of the copying apparatus shown in FIG. 1 is accomplished by a microcomputer (CPU) 50. CPU 50 is provided with a built-in read only memory (ROM) 51 for storing control programs, and a random access memory (RAM) 52 for temporarily storing control information. CPU 50 is also provided with various internal circuits for the independent execution of programs. Such internal circuits include a pulse generator circuit 53 and an event counter circuit 54 as shown in FIG. 3.

Pulse generator circuit 53 divides clock pulses created by an oscillating element of the CPU 50 by a predetermined frequency-dividing ratio, so as to output clock pulses of predetermined frequency. If the frequency-dividing ratio and the start of operation are specified by the program, the clock pulse output of pulse generator circuit 53 may subsequently be continuous independent of program execution. The cessation of clock pulses may be specified by program termination.

Event counter circuit 54 counts the number of clock pulses output fed from the pulse generator circuit 53, and an interrupt process is started when a predetermined count value is reached. If the count value and the start of operation are specified by the program, the count of event counter circuit 54 may be continuous independent of program execution, and the interrupt process may be started when the specified count value is reached. The cessation of the counting operation may be specified by program termination.

Signals generated from pulse generator circuit 53 and event counter circuit 54 are input fed to a clock input pin of controller 55. Controller 55 outputs to driver circuit 56 the various excitation phase (A-phase, B-phase, Ā-phase, B̄-phase) waveforms shown in FIG. 4 in accordance with the input fed clock pulses. Controller 55 selects the rotational direction of each motor M1, M2, M3 by selecting the voltage applied to cw/ccw pins by signals output fed from CPU 50.

Driver circuit 56 supplies electrical current to the coils of motors M1, M2, M3 which are connected to the output section of driver 56. Driver circuit 56 is a typical amplifier circuit comprising integrated circuits (ICs) and transistors.

Selector 57 selects the actuation of motors M1, M2, M3 (i.e., the connection relative to driver circuit 56), and comprises transistors Q1, Q2, Q3, and logic circuit 58. Logic circuit 58 selectively operates transistors Q1, Q2, Q3 in accordance with signals output fed from CPU 50.

To achieve rotation of motors M1, M2, M3, the motor to be rotated is first selected by selector 57, a frequency-dividing ratio corresponding to the number of required rotations of the selected motor is set in pulse generator circuit 53 by CPU 50, and a count number corresponding to the amount of required rotation is set in event counter circuit 54 by CPU 50. At the same time, pulse generation is specified. When a predetermined amount of rotation is achieved (i.e., when a predetermined number of pulses have been counted by event counter circuit 54), the interrupt process is executed.

When the selected motor stops, pulse generation may be terminated if an interrupt process is being executed. When the number of rotations changes, the frequency-dividing ratio of pulse generator circuit 53 may also be changed. Because the set value of event counter circuit 54 corresponds to the amount of rotation from the start of pulse generation, data expressing a position from the set value may be corrected when executing position control.

Figure 5:
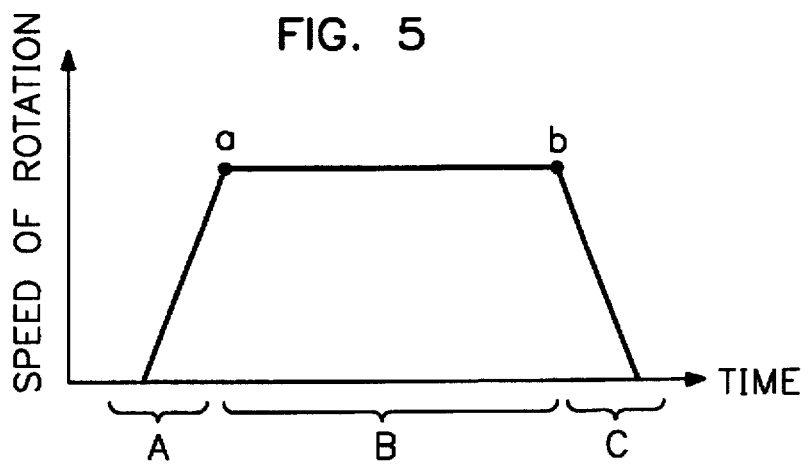
FIG. 5 is a chart showing an example of a stepping motor control method (trapezoidal method)

The motor control will now be described in detail. In general, trapezoidal control and call control shown in FIG. 5 are executed relative to the stepping motors. Directly after the start of rotation (area A in FIG. 5), acceleration must be smooth and rapid, such that the speed changes over a minute interval of one to several pulses. However, since the original pulse frequency is low at area A, the time interval for executing an interrupt process will not be unduly short. That is, the load on CPU 50 will be slight. In area B where control maintains a uniform speed, the pulse frequency is set higher, such that adequate time passes from the start of rotation of the motor so that the speed need not change over a short interval. Since special position detection is not required from point "a" to point "b" in particular, the interrupt process need not be started, and the processing load on CPU 50 is light even when the motor is driven at high speed. Further, in area C where control maintains the stop position, the pulse frequency is low similar to that of the previously mentioned area A, such that the processing load on CPU 50 is light.

In the present embodiment, the plurality of connected motors M1, M2, M3 cannot be simultaneously actuated and the time interval for starting the interrupt process may be lengthened, so as to reduce the processing load on CPU 50. In the present embodiment, motors M1, M2, M3 need not be actuated simultaneously, particularly since high-speed rotation of scanning motor M1 is readily realized, which has the advantage of maintaining a low occupancy ratio of the ports of CPU 50.

A disadvantage arises when a plurality of stepping motors are selectively driven singly inasmuch as a motor rotates unnecessarily at the time of such selection.

Figure 4:
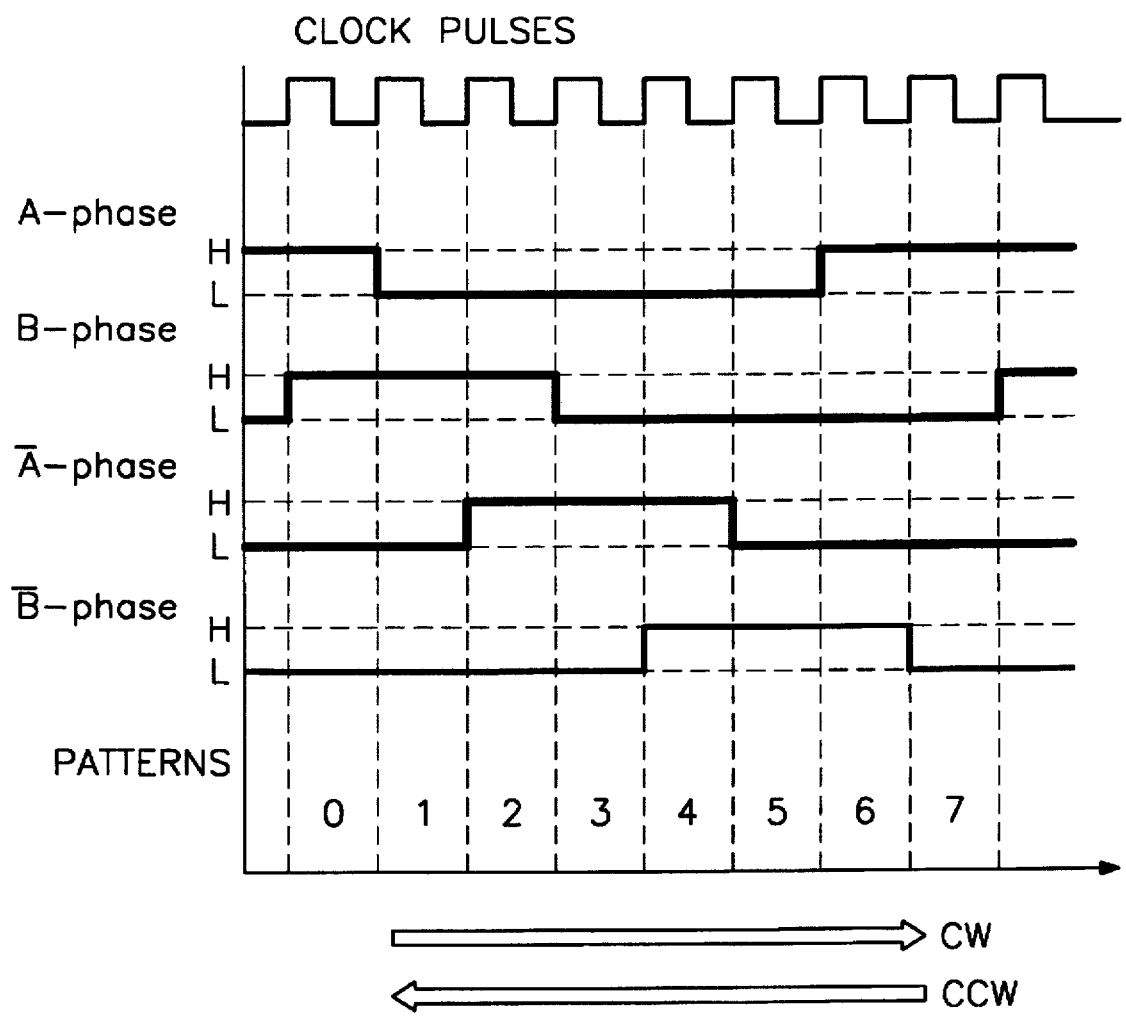
FIG. 4 is a chart showing the excitation phases of the stepping motors of FIG. 3.

That is, when the relationship between the direction of rotation and each excitation phase of a stepping motor is defined as shown in FIG. 4, eight waveform patterns are defined as waveforms 0–7 in the case of 1–2 phase excitations. When these patterns change 0, 1, 2, 3, . . . , the rotational direction cw changes 7, 6, 5, 4, . . . , and is defined as ccw. (It should be understood that these definitions are relative definitions and are used only as a convenience to facilitate understanding of the present invention.)

As an example, when controller 55 outputs waveform pattern 0, selector 57 does not select any of the motors M1, M2, M3 (OFF mode). At this time, lens motor M2 rotates five pulses in the cw direction. The procedure is that selector 57 selects lens motor M2, controller 55 cw/ccw pin is set at cw, and five pulses are generated. Pulse generation is accomplished by the previously described pulse generation circuit 53, and pulse generation is stopped by an interrupt process at the moment event counter circuit 54 attains a pulse count of five. Lens motor M2 thus rotates in the cw direction only five pulses, then stops. At this time, controller 55 and lens motor M2 are stopped at waveform pattern 5.

Then, mirror motor M3 is rotated seven pulses in the ccw direction. Selector 57 selects mirror motor M3, the ccw pin of controller 55 is selected, and seven pulses are generated. When rotation is completed, controller 55 and mirror motor M3 are stopped at waveform pattern 6.

Then, if selector 57 selects lens motor M2 to again rotate lens motor M2, a problem arises. Specifically, in the previous cycle, lens motor M2 stopped at pattern 5, but controller 55 changed to pattern 6 to rotate mirror motor M3. In this state, when selector 57 selects lens motor M2, lens motor M2 will rotate one pulse in the cw direction, i.e., lens motor M2 rotates without a pulse being output fed from CPU 50, disrupting position control of lens 15 via lens motor M2.

In the present embodiment, the excitation phase of the connected motor for the previous cycle is compared to the excitation phase of controller 55 directly after motor selection is accomplished by selector 57. When the result of the comparison shows different excitation phases, a pulse is generated by pulse generator 53 so as to match the excitation phase of the motor with the excitation phase of controller 55. Thus, the motor is not unnecessarily rotated when motor selection occurs, and precise position control is achieved.

The control sequence used by CPU 50 to control motors M1, M2, M3 will now be described.

In the following description, octal notation counters S, L, M corresponding to motors M1, M2, M3, respectively, and octal notation counter C corresponding to controller 55 are used for control. These counters are prepared in RAM 52, and execute processes of addition and subtraction and the like in accordance with the program. These counters use octal notation to coincide with the patterns of eight excitation phase combinations, as shown in FIG. 4; however, it is to be noted that quaternary counters may be used to coincide with the four patterns when two-phase excitation is used.

Selector 57 is provided with a mode for selecting any among motors M1, M2, M3, and an OFF mode when none are selected.

Figure 6:
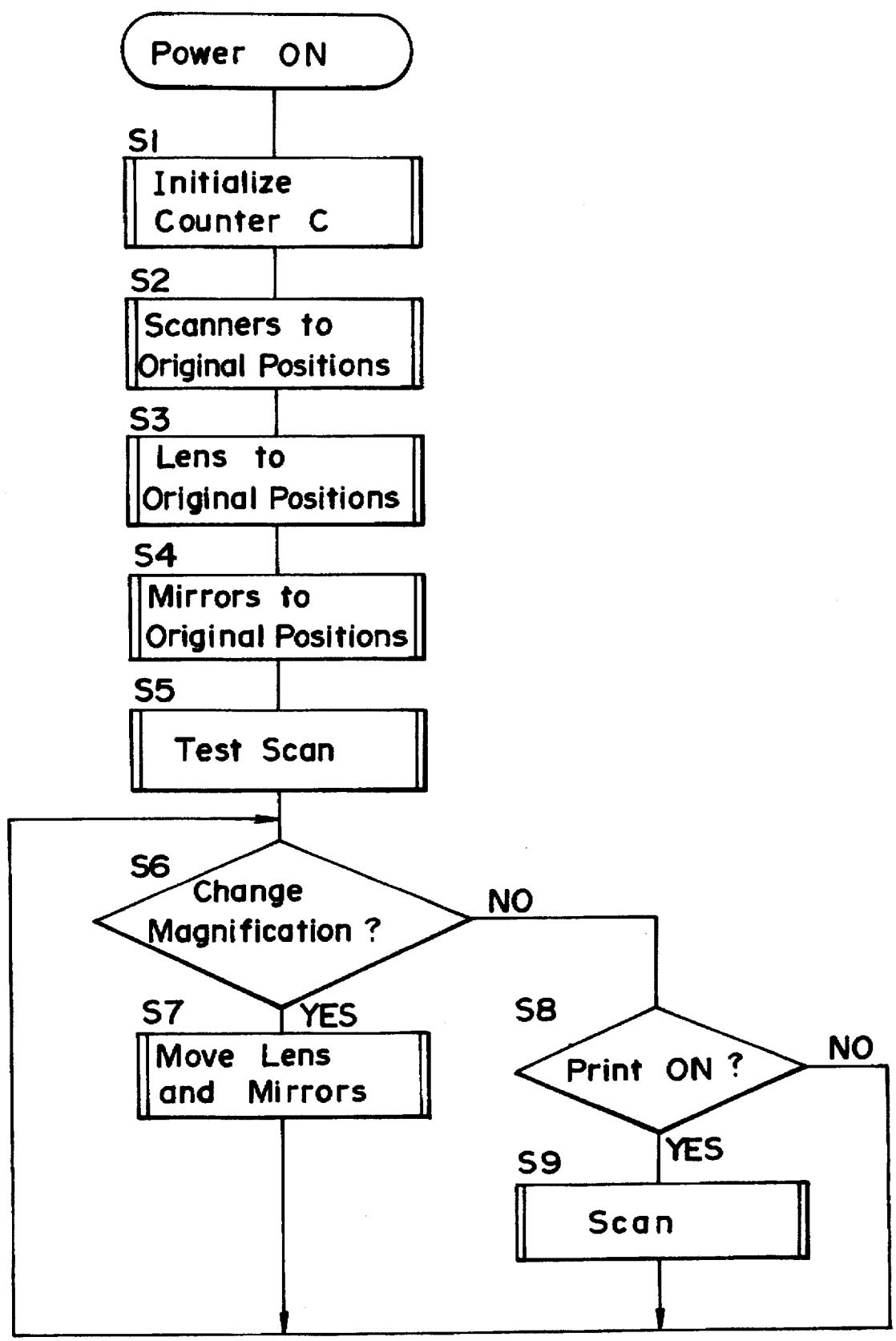
FIG. 6 is a flow chart showing the control sequence (main routine) executed by the CPU of the control circuit of FIG. 3.
Figure 7:
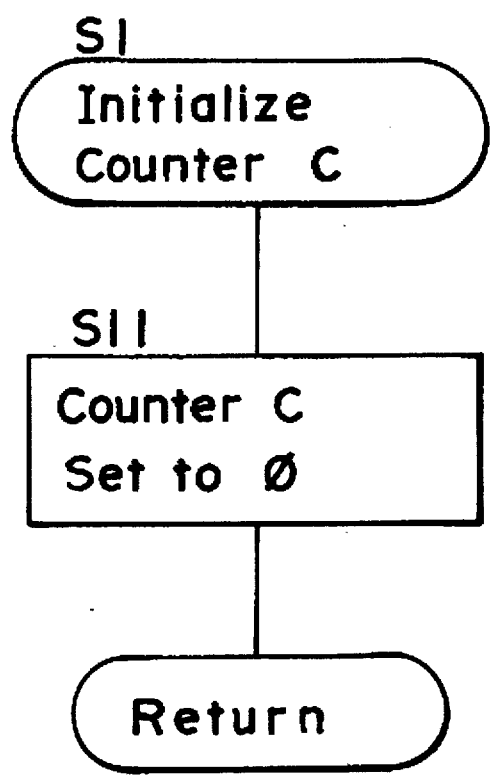
FIG. 7 is a flow chart of a subroutine of the main routine of FIG. 6 showing the control sequence for initialization of controller and counters.

FIG. 6 shows the main routine executed by CPU 50. When the power source is turned ON, counter C of controller 55 is initialized in step S1. That is, counter C is reset to [0] before any of the motors M1, M2, M3 are rotated (refer to step S11 of FIG. 7 which shows the subroutine of step S1). Then, in steps S2, S3, and S4, scanners 21 and 22, lens 15, and mirrors 16 and 17 are returned to their respective original positions, and test scanning is executed in step S5.

Thereafter, a check is made in step S6 to determine whether or not an input has changed the magnification setting. If YES, the flow proceeds to step S7 where lens 15 and mirrors 16 and 17 are moved to predetermined positions. If the result of the inquiry in step S6 is NO, the flow proceeds to step S8 where it is checked whether the print key is ON. If YES, the copy operation is executed in step S9. If NO, the flow returns directly to step S6.

Figure 8:
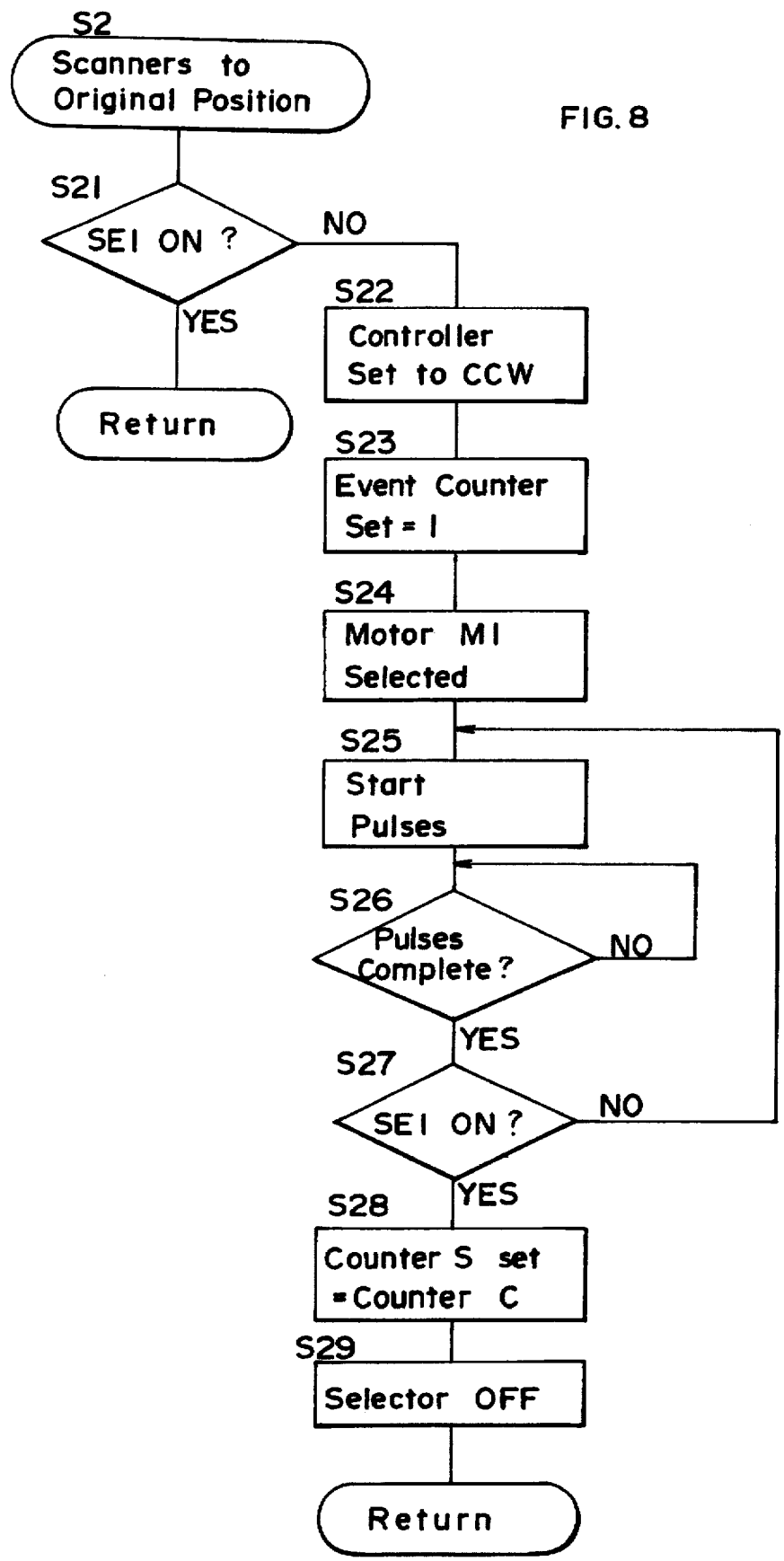
FIG. 8 is a flow chart of a subroutine of the main routine of FIG. 6 showing the control sequence for returning scanners to their original positions.

FIG. 8 shows the subroutine of step S2 for returning scanners 21 and 22 to their respective original positions.

In the present embodiment, scanners 21 and 22 move in the ccw direction, and are returned to their original positions at which sensor SE1 is turned ON by protrusion 23. In step S21, a check is made to determine whether or not sensor SE1 is OFF or ON. When sensor SE1 is found to be ON, the subroutine ends immediately. When sensor SE1 is found to be OFF, controller 55 is set in the ccw direction in step S22, event counter circuit 54 is set at [1] in step S23, and scanning motor M1 is selected by selector 57 in step S24.

In step S25, pulses are generated from pulse generator 53, and each time pulsing completion is determined in step S26 (in this case one pulse), the ON/OFF state of sensor SE1 is checked in step S27, and scanning motor M1 rotates in the ccw direction in single pulse increments until sensor SE1 is turned ON. That is, the interrupt process starts for each single pulse. In the interrupt process (see FIG. 9), pulse generation is stopped in step S31, and the rotational direction is determined in step S32. When the rotation direction is cw, counter C increments in step S33, whereas when the rotation direction is ccw, counter C decrements in step S34.

When scanners 21 and 22 have returned to their respective original positions (step S27: YES), the value of counter C is substituted in counter S in step S28 (refer to steps S33, S34, FIG. 9), and selector 57 is set in the OFF mode in step S29. Counter S is initialized in step S28.

Figure 10:
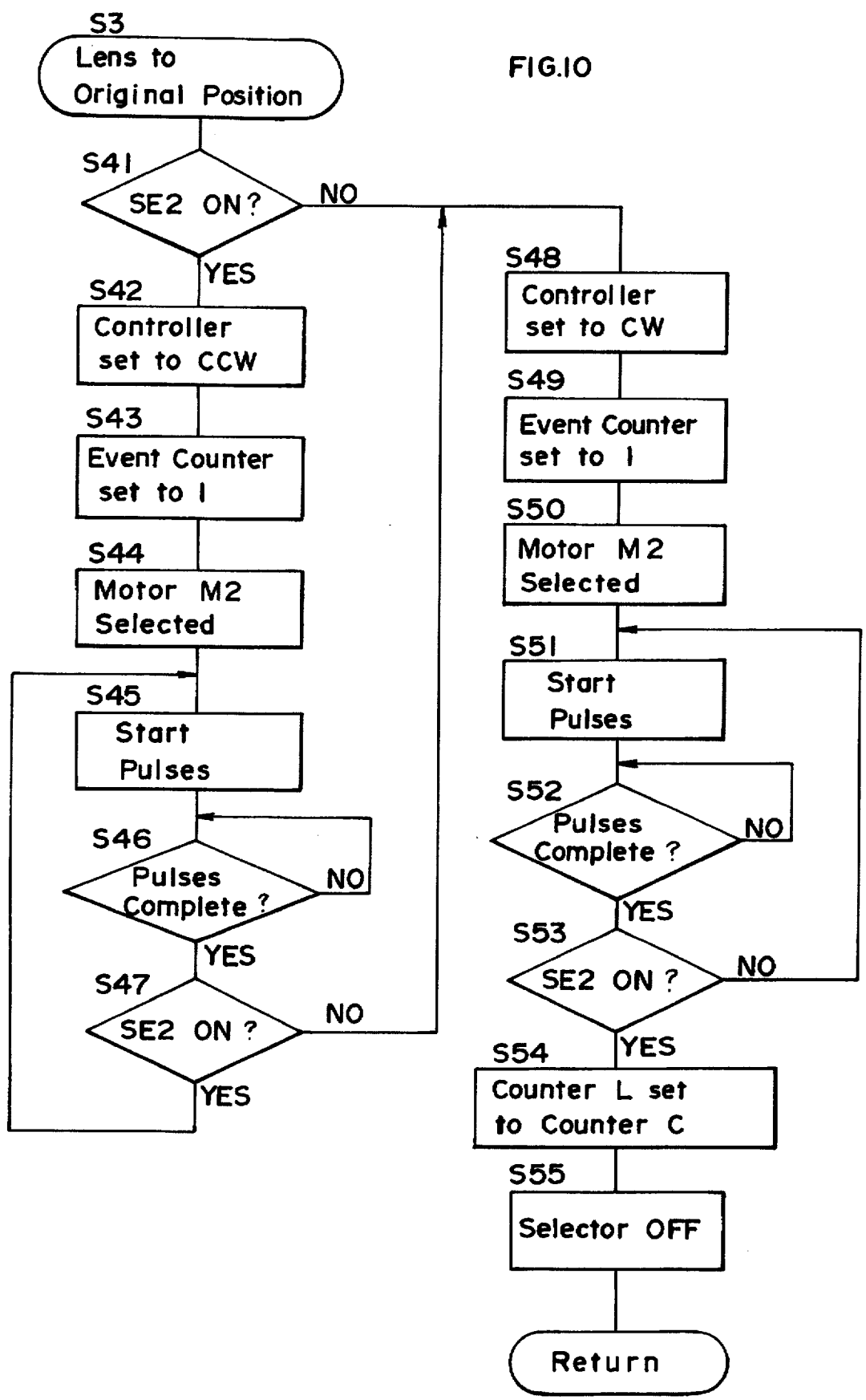
FIG. 10 is a flow chart of a subroutine of the main routine of FIG. 6 showing the control sequence for returning a lens to its original position.

FIG. 10 shows the subroutine of step S3 for returning lens 15 to its original position.

In the present embodiment, the cw direction moves lens 15 in a direction approaching a document (expansion direction), and the ccw direction moves lens 15 away from the document (contraction direction). When lens 15 moves in the cw direction such that sensor SE2 is turned ON, it has returned to its original position.

In step S41, a check is made to determine whether or not sensor SE2 is ON or OFF. When sensor SE2 is ON, steps S42-S47 are executed, and lens 15 is gradually moved in the ccw direction until sensor SE2 is turned OFF. That is, controller 55 is set in the ccw direction in step S42, event counter circuit 55 is set at [1] in step S43, and motor M2 is selected by selector 57 in step S44. In step S45, pulses are generated by pulse generator 53, and each time pulsing completion is determined in step S46 (in this case, one pulse), the ON/OFF state of sensor SE2 is checked in step S47. In this instance, the interrupt process (refer to FIG. 9) is executed such that lens motor M2 rotates in the ccw direction in single pulse increments until sensor SE2 is turned OFF, whereupon counter C decrements (step S34).

When sensor SE2 is determined to be OFF in step S41 or S47, steps S48-S55 are executed; and lens 15 is moved in the cw direction until sensor SE2 is turned ON to indicate a return to the original position. That is, controller 55 is set in the cw direction in step S48, and steps S49-S53 are executed (these steps are identical to steps S43-S47). When lens 15 is returned to the original position (step S53: YES), the count value of counter C is substituted in lens counter L in step S54, and selector 57 is set in the OFF mode in step S55. Counter L is initialized in step S54.

Figure 11:
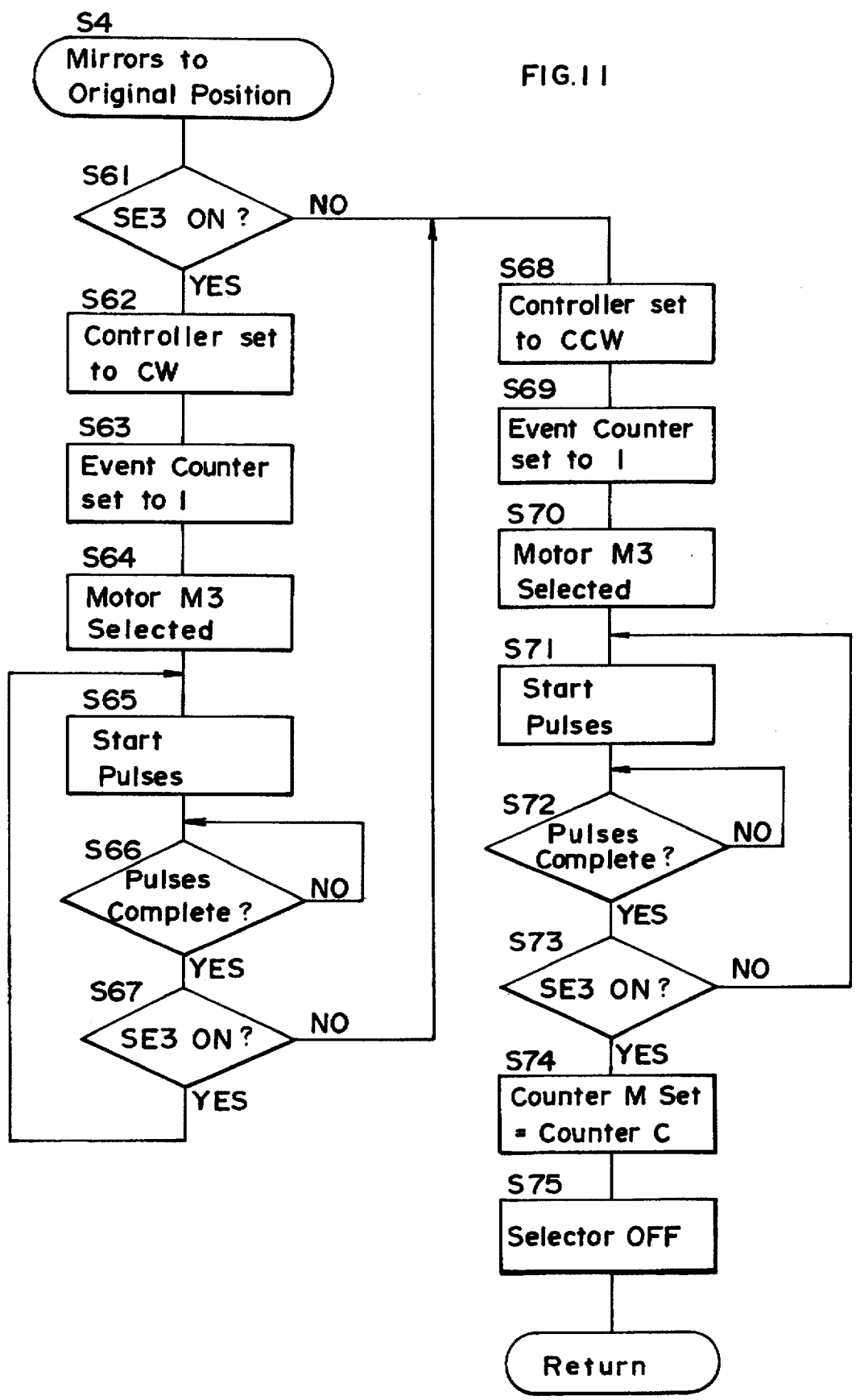
FIG. 11 is a flow chart of a subroutine of the main routine of FIG. 6 showing the control sequence for returning mirrors to their original positions.

FIG. 11 shows the subroutine of step S4 for returning mirrors 16 and 17 to their respective original positions.

In the present embodiment, mirrors 16 and 17 move in the cw direction to increase the conjugate length, and move in the ccw direction to decrease the conjugate length. Mirrors 16 and 17 are returned to their respective original positions when moved in the ccw direction and sensor SE3 is turned ON by protrusion 41.

A check is made in step S61 to determine whether sensor SE3 is ON or OFF. When sensor SE3 is ON, steps S62-S67 are executed, and mirrors 16 and 17 gradually move in the cw direction until sensor SE3 is turned OFF. That is, controller 55 is set in the cw direction in step S62, event counter circuit 54 is set at [1] in step S63, and mirror motor M3 is selected by selector 57 in step S64. In step S65, a pulse is generated by pulse generator circuit 53, and each time pulsing completion is determined in step S66 (in this case, one pulse), the ON/OFF state of sensor SE3 is checked in step S67. In this instance, the interrupt process (refer to FIG. 9) is executed such that mirror motor M3 rotates in the cw direction in single pulse increments until sensor SE3 is turned OFF, whereupon counter C increments (step S33).

When sensor SE3 is determined to be OFF in step S61 or S67, steps S68-S75 are executed, and mirrors 16 and 17 are moved in the ccw direction until sensor SE3 is turned ON to indicate a return of the mirrors to their original positions. That is, controller 55 is set in the ccw direction in step S68, and steps S69-S73 are executed (these steps are identical to steps S63-S67). When mirrors 16 and 17 are returned to their original positions (step S73: YES), the count value of counter C is substituted in mirror counter M in step S74, and selector 57 is set in the OFF mode in step S75. Counter M is initialized in step S74.

Figure 12:
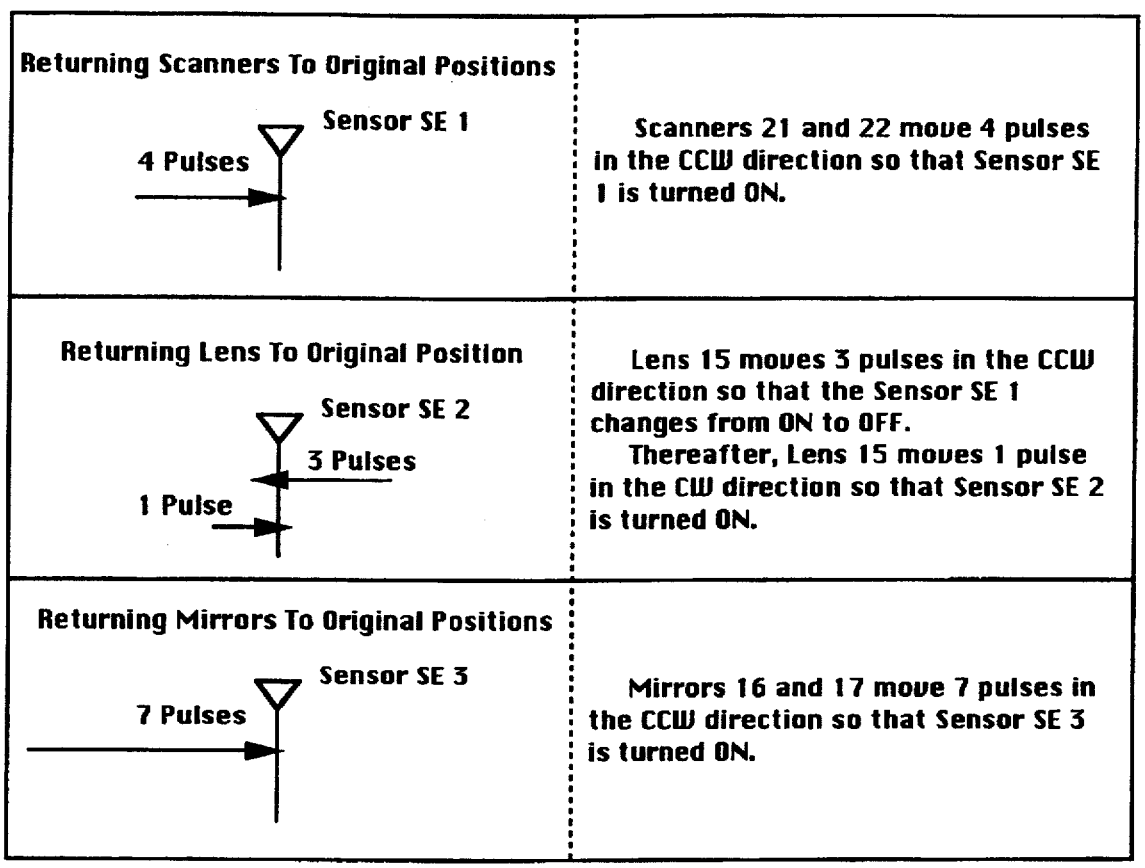
FIG. 12 is an illustration showing examples of scanners, lens, and mirrors returned to their original position.

Scanners 21 and 22, lens 15, and mirrors 16 and 17 are assumed to have been returned to their respective original positions in the state illustrated in FIG. 12. At this time, each counter C, S, L, M operates by the values shown in FIG. 13. These counters are octal ring counters, which ignore carry and borrow functions in addition and substraction. These counters are thus used to determine the pattern among patterns 0-7.

The test scan of step S5 is then executed (refer to FIG. 14). In the test scan, scanners 21 and 22 move 2,500 pulses in the cw direction, and return 2,500 pulses in the ccw direction. As shown in FIG. 13, the value of counter C is [3] and the value of counter S is [4]. Accordingly, in this state, when scanning motor M1 is selected by selector 57, the excitation phase of the previous cycle of scanning motor M1 when it was stopped does not match the current excitation phase output fed by controller 55, such that scanning motor M1 is unnecessarily rotated. At this juncture, with selector 57 set in the OFF mode, controller 55 is set in the cw direction, and a number (S–C, i.e., value of counter S minus the value of counter C) of pulses are generated, such that the excitation phase of controller 55 matches the excitation phase of scanning motor M1.

Figure 9:
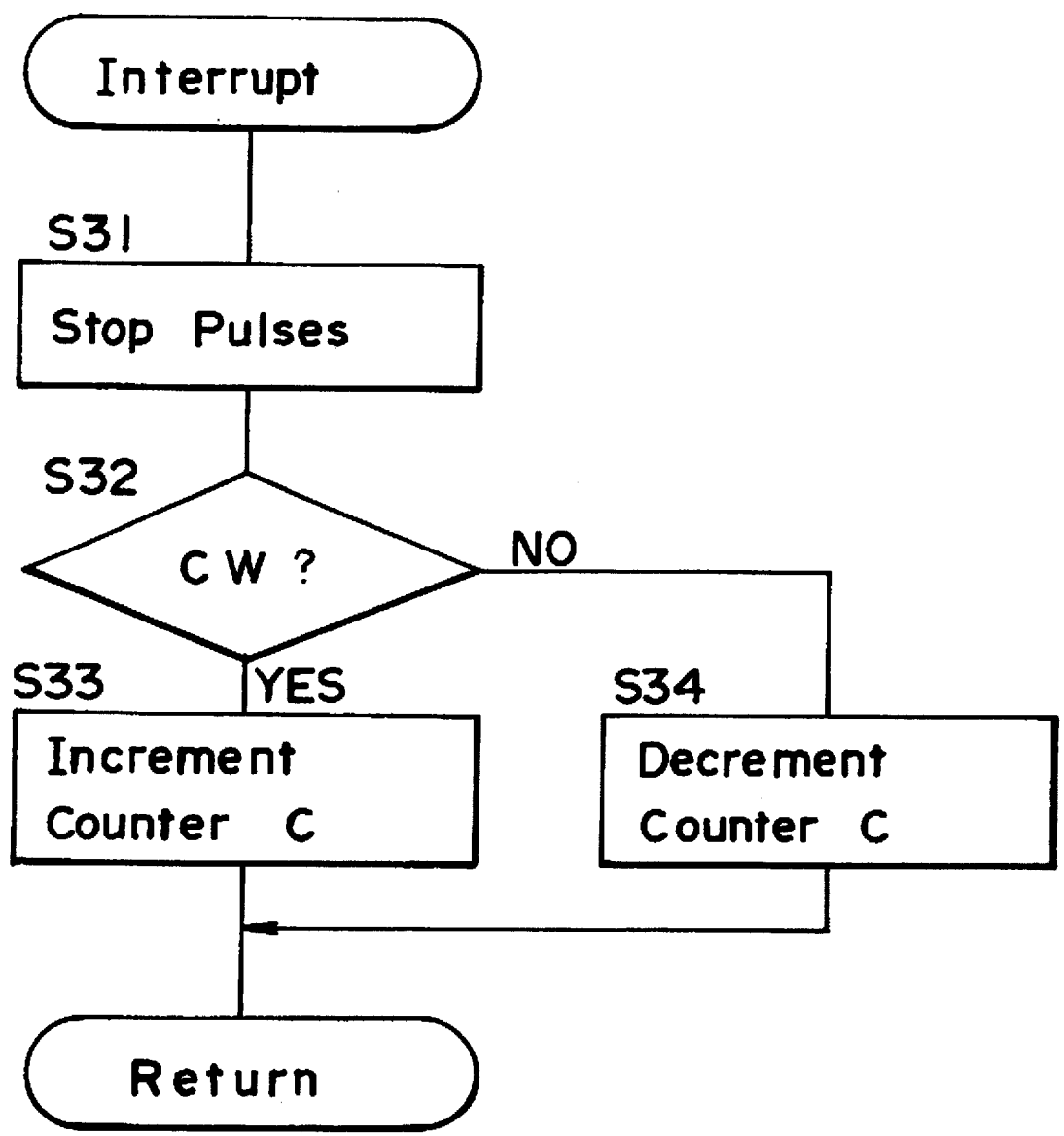
FIG. 9 is a flow chart showing the control sequence of an interrupt process for incrementing/decrementing counters.

Specifically, initialization of counter S is verified in step S81 (refer to step S28 in FIG. 8), and the values of counter C and S are compared in step S82. When C=S, the routine advances to step S88; when C≠S, the excitation phase of controller 55 is corrected in steps S83-S87. That is, the value (S–C) is set in event counter circuit 54 in step S83, and controller 55 is set in the cw direction in step S84. At the same time, selector 57 is set in the OFF mode in step S85. Then, pulses are generated by pulse generator circuit 53 in step S86, and the interrupt process of FIG. 9 is executed until the number of pulses (C–S) have been generated (step S87). At this time, the excitation phase of controller 55 matches the excitation phase of scanning motor M1.

In steps S88-S92, scanners 21 and 22 are moved 2,500 pulses, and in steps S93-S97 the scanners are returned 2,500 pulses. That is, controller 55 is set in the cw direction in step S88, and scanning motor M1 is selected by selector 57 in step S89. In step S90, the value [2,500] is set in event counter circuit 54, and in step S91, pulse generation is started. In step S92, the interrupt process of FIG. 9 is executed until the generation of the aforesaid 2,500 pulses is completed, such that scanners 21 and 22 are moved 2,500 pulses in the cw direction.

Thereafter, controller 55 is set in the ccw direction in step S93, and scanning motor M1 is selected by selector 57 in step S94. In step S95, the value [2,500] is set in event counter circuit 54, and pulse generation is started in step S96. In step S97, the interrupt process of FIG. 9 is executed until generation of 2,500 pulses is completed. Then, the value of counter C is substituted in scan counter S in step S98, and selector 57 is set in the OFF mode in step S99.

When scanners 21 and 22 are returned to their original positions by the scanner return process (step S21: YES), counter S initialization (refer to step S28) is not executed. In this instance, comparison of counters C and S, and correction of the excitation phase of controller 55 are not executed (step S81: NO), and a test scan is immediately executed (refer to steps S88-S97), whereupon counter S is initialized in step S98.

Figure 16:
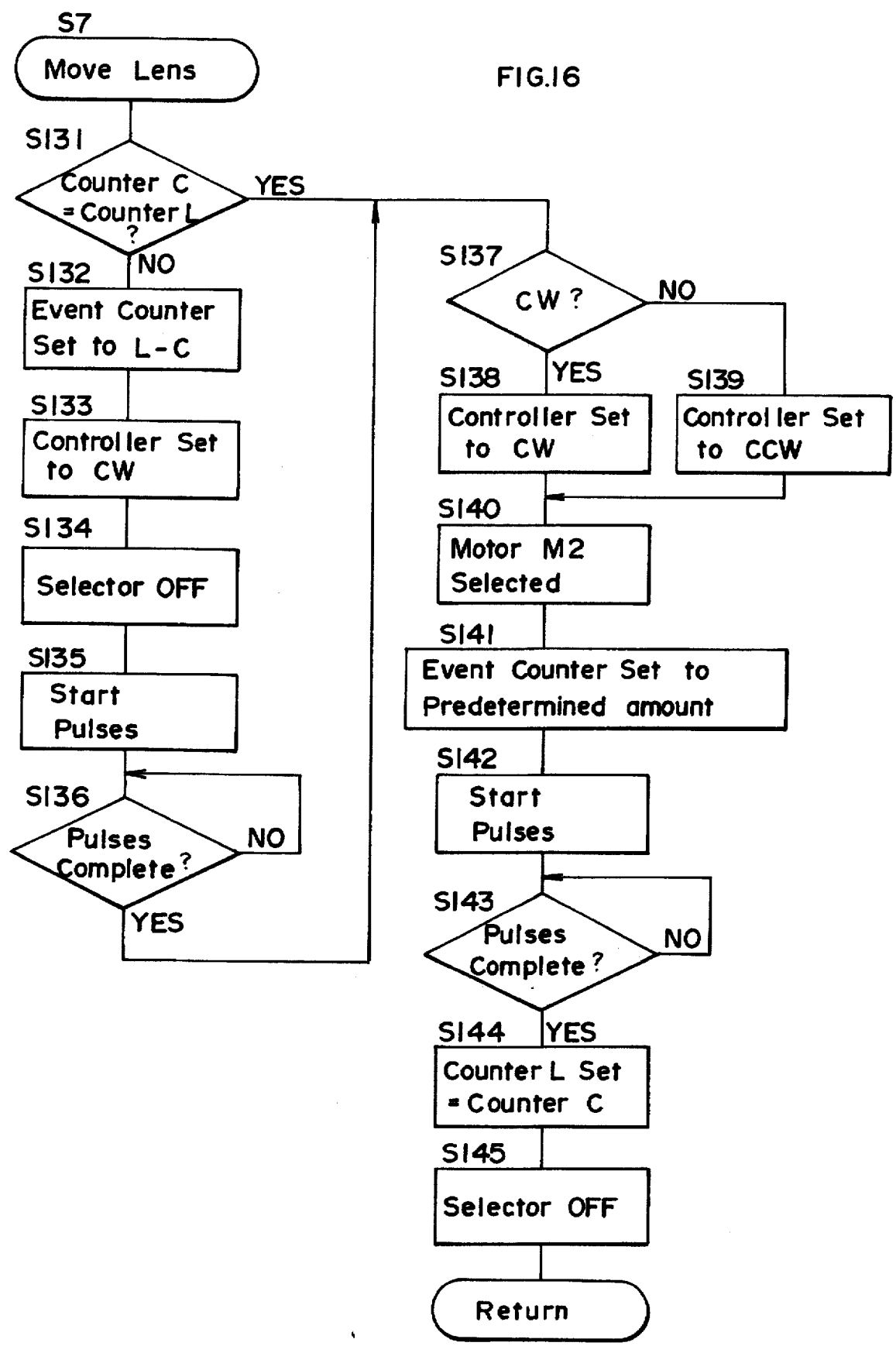
FIG. 16 is a flow chart of a subroutine of the main routine of FIG. 6 showing the control sequence for lens movement during variable magnification.
Figure 17:
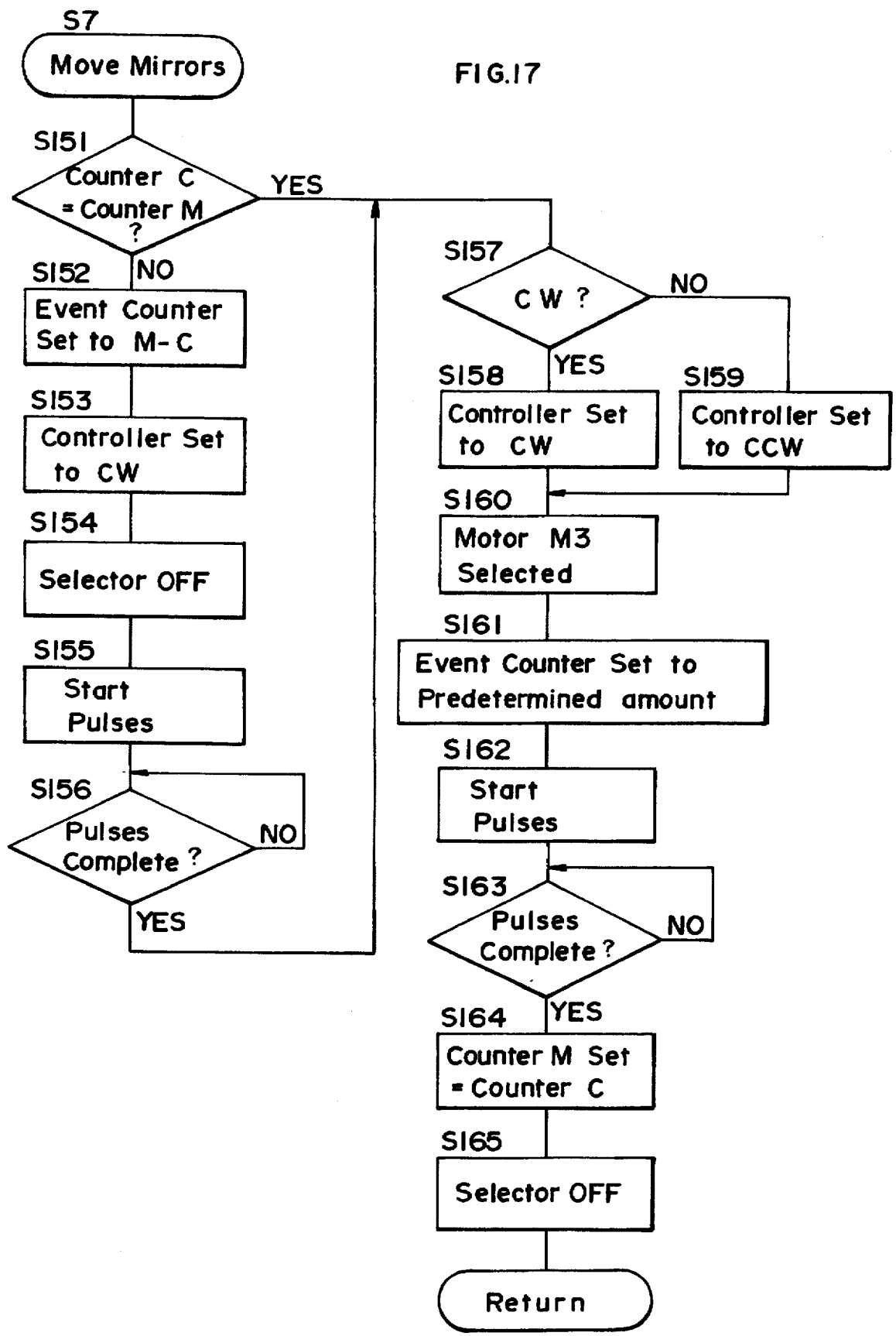
FIG. 17 is a flow chart of a subroutine of the main routine of FIG. 6 showing the control sequence for mirror movement during variable magnification.

When the above-described test scan ends, the copying apparatus enters a standby state, such that when the ON condition of the print key is verified in step S8 (FIG. 6), the copy operation starts in step S9, and optical unit 10 scans during the copy operation. FIG. 15 shows the subroutine of the scanning operation during the copying process. When the copy magnification change specification is verified in step S6, lens 15 and mirrors 16 and 17 are moved to predetermined positions in step S7. FIGS. 16 and 17 show subroutines for moving the lens and moving the mirrors, respectively, under the present conditions.

The control sequences in the subroutines of FIGS. 15, 16, and 17 are executed when the test scan condition is similar to that of FIG. 14. Steps S102-S106, steps S132-S136 and steps S152-S156, in particular, compare the value of counter C with the values of the initialized counters S, L and M, respectively, and correct the excitation phase of controller 55. Thereafter, scanners 21 and 22, lens 15, and mirrors 16 and 17 are moved predetermined amounts in steps S107-S119, steps S137-S145 and steps S157-S165, respectively.

Figure 18:
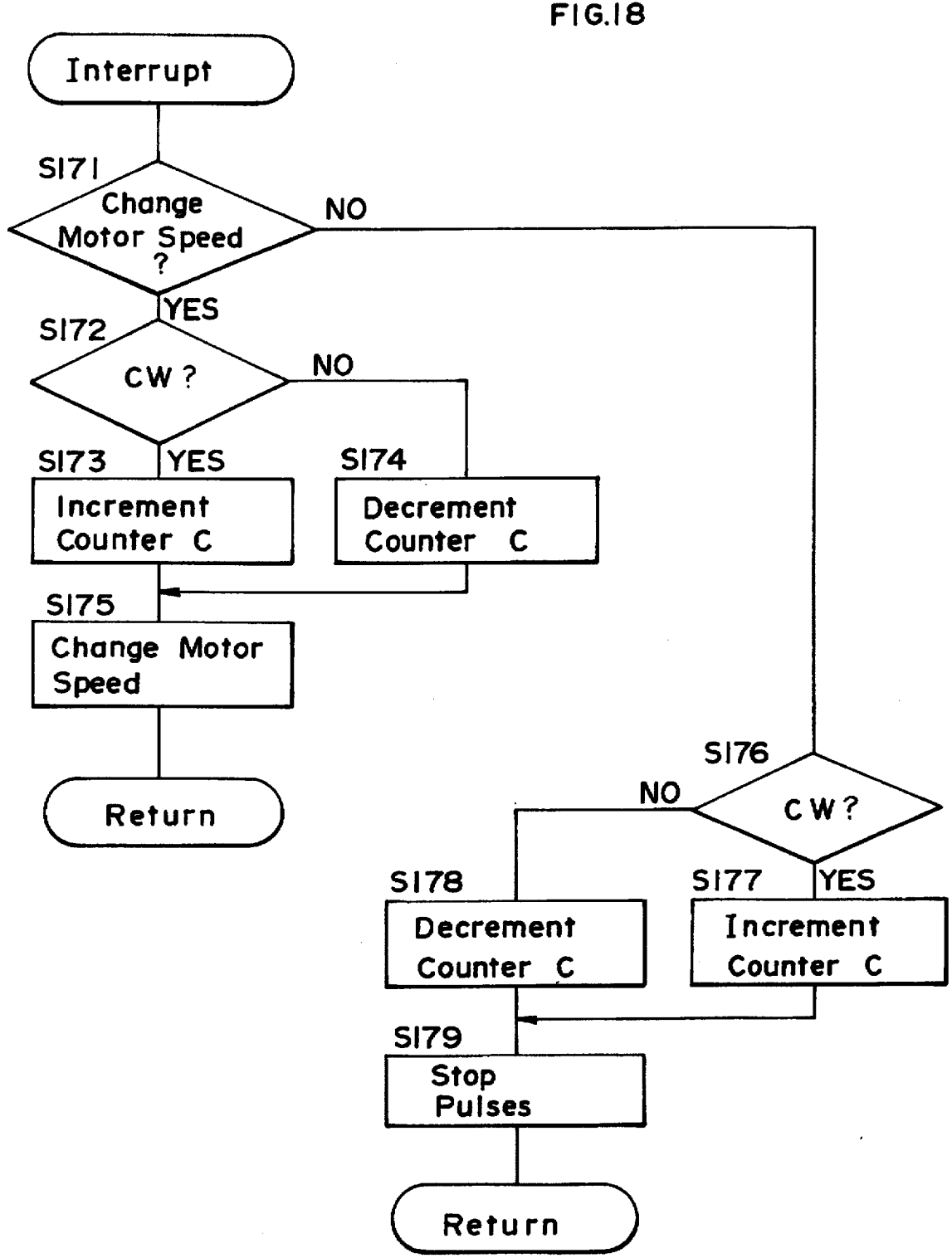
FIG. 18 is a flow chart showing the control sequence for the interrupt process for acceleration-deceleration-continuous speed processes of the stepping motors.

In the above movement processes, an acceleration-deceleration-continuous speed process is also executed for motors M1, M2, M3. This acceleration-deceleration-continuous speed process is executed as the interrupt process shown in FIG. 18 as steps S172-S175 for the acceleration-deceleration process and steps S176-S179 for the continuous speed process. The movement processes and interrupt processes for acceleration-deceleration-continuous speed are achieved by the normal control sequences and further description thereof is, therefore, omitted herefrom.

The control circuit shown in FIG. 3 relates to the use of stepping motors of unipolar type. However, there are also stepping motors of bipolar type. In unipolar type stepping motors, selector 57 is provided between the power source and the center tap such that a common power source line extends from the center tap. However, in bipolar type stepping motors, selector 60 is provided between clock controller 55 and drivers 56-1, 56-2, 56-3 for driving the respective stepping motors M1, M2, M3, as shown in FIG. 19. Selector 60 comprises logic circuits 61 and 62. Logic circuit 61 selectively operates selector pins 61-1, 61-2, 61-3 in accordance with signals received from CPU 50. Logic circuit 62 selectively operates drivers 56-1, 56-2, 56-3 in accordance with signals received from controller 55 and signals received from logic circuit 61.

The control sequences for stepping motors M1, M2, M3 via the control circuit shown in FIG. 19 are identical to those of the flow charts shown in FIGS. 6-18.

While what has been described herein constitutes presently preferred embodiments, it should be understood that the motor control device of the present invention is not so limited and may be variously modified. For example, the motor control device of the present invention is not limited to controlling an optical scanning system of a copying apparatus, but may be used in other applications as well. It should be recognized, accordingly, that the invention should be limited only insofar as is required by the scope of the following claims.

I claim:

1. A motor control device for singly controlling each of a plurality of stepping motors, said motor control device comprising:

a pulse generator;

a pulse counter for counting the number of pulses generated by said pulse generator;

a single driver for singly driving each of said plurality of stepping motors in accordance with pulses generated by said pulse generator;

a selector for selecting one of connections between said driver and each respective one of said plurality of stepping motors;

a comparator for comparing an excitation phase of said driver and an excitation phase of a respective stepping motor; and a controller for matching the excitation phase of said driver and the excitation phase of the respective stepping motor based on results of the comparison by said comparator without rotating any of said stepping motors.

2. The motor control device as claimed in claim 1, wherein said comparator compares the excitation phase outputted by said driver with the excitation phase of about-to-be-selectively connected stepping motor which was stationary in a previous cycle which occurred directly before a selection of a connection between the driver and the about-to-be-selectively connected stepping motor by said selector, and wherein when results of comparison by said comparator show different excitation phases, said controller connects the driver with the about-to-be-connected stepping motor only after generation of a pulse by the pulse generator which causes a match of the excitation phase of the driver with the excitation phase of said about-to-be-connected stepping motor.

3. A motor control device for controlling a plurality of stepping motors, said motor control device comprising:

a pulse generator which outputs clock pulses of a predetermined frequency;

a clock controller which outputs various excitation phase waveforms in accordance with clock pulses of said pulse generator inputted thereto;

a selector which selects one of said stepping motors;

a driver which drives a thus selected stepping motor by supplying electrical current to the selected stepping motor according to the excitation phase waveform outputted by said clock controller;

a controller counter which stores a count value indicating the excitation phase waveform of the clock controller;

a plurality of motor counters respectively corresponding to said plurality of stepping motors, each of said motor counters storing a count value indicating the excitation phase waveform of its corresponding stepping motor;

a comparator which compares the count value of the controller counter with the count value of the motor counter of a first stepping motor of said plurality of stepping motors in case the first stepping motor is to be selected by said selector; and a controller which, when results of comparison by said comparator shows different excitation phase waveforms, controls said selector so that the selector selects none of the stepping motors until the excitation phase waveform of the clock controller matches the excitation phase waveform of the first stepping motor, and thereafter selects the first stepping motor to drive the first stepping motor.

4. A motor control device as claimed in claim 3 wherein one of said plurality of stepping motors drives a scanner of a copying machine.

5. A motor control device as claimed in claim 3 wherein one of said plurality of stepping motors drives a lens of a copying machine as a function of magnification.

6. A motor control device as claimed in claim 3 wherein one of said plurality of stepping motors drives a mirror of a copying machine.

7. A motor control device as claimed in claim 3 wherein said driver includes a plurality of driver circuits respectively corresponding to said plurality of stepping motors.

8. A motor control method for controlling a plurality of stepping motors, said motor control method comprising:

a first step of outputting clock pulses of a predetermined frequency;

a second step of outputting various excitation phase waveforms in accordance with the clock pulses thus outputted in the first step;

a third step of selecting one of said stepping motors;

a fourth step of driving the thus selected stepping motor by supplying electrical current to the selected stepping motor according to the excitation phase waveform outputted in the second step;

a fifth step of storing a count value indicating the excitation phase waveform thus outputted in the second step;

a sixth step of separately storing for each of said plurality of stepping motors a count value indicating the excitation phase waveform of a corresponding one of the stepping motors;

a seventh step of comparing the count value stored in the fifth step with the count value of a first stepping motor of said plurality of stepping motors stored in the fifth step; and an eighth step of selecting none of said stepping motors when the results of comparison in the seventh step shows different excitation phase waveforms, and thereafter, when the excitation phase waveform indicated by the count value in the fifth step matches the excitation phase waveform of one of said stepping motors, selecting said one of said stepping motors to drive said one of said stepping motors.

9. A motor control method as claimed in claim 8, wherein one of said plurality of stepping motors drives a scanner of a copying machine.

10. A motor control method as claimed in claim 8, wherein one of said plurality of stepping motors drives a lens of a copying machine as a function of magnification.

11. A motor control method as claimed in claim 8, wherein one of said plurality of stepping motors drives a mirror of a copying machine.

* * * * *